United States Patent
Grau et al.

(10) Patent No.: US 8,613,452 B2
(45) Date of Patent: Dec. 24, 2013

(54) ELECTROMECHANICAL ACTUATOR, ESPECIALLY FOR AN ANTI-ROLL OF A MOTOR VEHICLE

(75) Inventors: Ulrich Grau, Emskirchen (DE); Thorsten Meyerhoefer, Göttelhöf (DE); Ralf Mayer, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 149 days.

(21) Appl. No.: 13/054,225

(22) PCT Filed: Jun. 22, 2009

(86) PCT No.: PCT/EP2009/057710
§ 371 (c)(1),
(2), (4) Date: Mar. 2, 2011

(87) PCT Pub. No.: WO2010/006878
PCT Pub. Date: Jan. 21, 2010

(65) Prior Publication Data
US 2011/0140378 A1  Jun. 16, 2011

(30) Foreign Application Priority Data
Jul. 15, 2008 (DE) .......................... 10 2008 033 270

(51) Int. Cl.
*B60G 21/055* (2006.01)
(52) U.S. Cl.
USPC .................. 280/5.511; 280/5.507; 280/5.506; 280/124.106
(58) Field of Classification Search
USPC .................. 280/5.507, 5.506, 5.508, 5.511, 280/124.106, 124.107
See application file for complete search history.

(56) References Cited

U.S. PATENT DOCUMENTS

| | | | |
|---|---|---|---|
| 3,252,303 A | 5/1966 | Weasler et al. | |
| 3,520,392 A * | 7/1970 | Carter et al. | 192/150 |
| 3,651,711 A * | 3/1972 | Greenwood et al. | 74/625 |
| 4,574,612 A * | 3/1986 | Tanikawa | 72/391.8 |
| 4,774,423 A * | 9/1988 | Karasawa et al. | 310/78 |
| 6,022,030 A * | 2/2000 | Fehring | 280/5.511 |
| 6,354,607 B1 * | 3/2002 | Kawashima et al. | 280/5.511 |
| 6,361,033 B1 * | 3/2002 | Jones et al. | 267/187 |
| 6,363,872 B1 * | 4/2002 | Heckner | 112/277 |
| 6,428,019 B1 * | 8/2002 | Kincad et al. | 280/5.511 |
| 6,439,583 B1 * | 8/2002 | Markowetz | 280/5.511 |
| 6,513,819 B1 * | 2/2003 | Oliver et al. | 280/124.152 |
| 6,550,788 B2 * | 4/2003 | Schmidt et al. | 280/5.511 |

(Continued)

FOREIGN PATENT DOCUMENTS

DE   103 51 484 A1   6/2005
DE   10 2004 038 248 B3   3/2006

(Continued)

*Primary Examiner* — Nicole Verley
(74) *Attorney, Agent, or Firm* — Lucas & Mercanti, LLP (57) ABSTRACT

An electromechanical actuator, especially for an anti-roll bar of a motor vehicle, that has two actuator elements, which can be rotated relative to each other about a common rotational axis, for which purpose an electric motor and a gearbox coupled therewith are provided. The electric motor is arranged in an actuator element for transmitting a torque, and an output shaft of the gearbox is coupled to the other actuator element. A mechanical overload coupling is provided in the torque-transmitting load path from the electric motor to the gearbox output shaft.

17 Claims, 4 Drawing Sheets

(56) References Cited

U.S. PATENT DOCUMENTS

| | | | |
|---|---|---|---|
| 6,637,757 B2 * | 10/2003 | Ignatius et al. | 280/5.511 |
| 7,121,559 B2 * | 10/2006 | Ersoy et al. | 280/5.511 |
| 7,150,458 B2 * | 12/2006 | Reichel et al. | 280/5.511 |
| 7,204,494 B2 * | 4/2007 | Reichel et al. | 280/5.506 |
| 7,293,780 B2 * | 11/2007 | Germain et al. | 280/5.506 |
| 7,644,783 B2 * | 1/2010 | Roberts et al. | 173/178 |
| 7,717,437 B2 * | 5/2010 | Adams et al. | 280/5.508 |
| 7,766,344 B2 * | 8/2010 | Buma | 280/5.511 |
| 7,818,880 B2 * | 10/2010 | Heep et al. | 29/888.04 |
| 7,832,739 B2 * | 11/2010 | Pinkos et al. | 280/5.511 |
| 7,886,841 B2 * | 2/2011 | Armstrong | 173/176 |
| 7,909,339 B2 * | 3/2011 | Pinkos et al. | 280/5.511 |
| 8,015,890 B2 * | 9/2011 | Christensen et al. | 74/89.38 |
| 8,083,006 B2 * | 12/2011 | Simm et al. | 173/178 |
| 8,104,546 B2 * | 1/2012 | Aeberhard | 173/178 |
| 8,109,522 B2 * | 2/2012 | Pinkos et al. | 280/5.511 |
| 8,118,314 B2 * | 2/2012 | Ersoy et al. | 280/5.511 |
| 8,313,108 B2 * | 11/2012 | Ac et al. | 280/5.5 |
| 2005/0029722 A1 * | 2/2005 | Reichel et al. | 267/188 |
| 2007/0107998 A1 * | 5/2007 | Vogt et al. | 188/163 |
| 2007/0182110 A1 * | 8/2007 | Urababa | 280/5.508 |
| 2008/0000710 A1 * | 1/2008 | Vortmeyer et al. | 180/282 |
| 2008/0277891 A1 * | 11/2008 | Adams et al. | 280/124.106 |
| 2010/0299868 A1 * | 12/2010 | Beskow et al. | 15/390 |

FOREIGN PATENT DOCUMENTS

| | | |
|---|---|---|
| DE | 10 2007 032 318 A1 | 1/2009 |
| EP | 0 009 544 A | 4/1980 |
| EP | 1 270 285 A | 1/2003 |
| EP | 1 445 484 A | 8/2004 |
| EP | 1 681 484 A | 7/2006 |
| EP | 1 702 723 A | 9/2006 |
| JP | 2008 168891 A | 7/2008 |
| WO | 2005/079134 A | 9/2005 |

* cited by examiner

ELECTROMECHANICAL ACTUATOR, ESPECIALLY FOR AN ANTI-ROLL OF A MOTOR VEHICLE

This application is a 371 of PCT/EP2009/057710 filed Jun. 22, 2009, which in turn claims the priority of DE 10 2008 033 270.4 filed Jul. 15, 2008, the priority of both applications is hereby claimed and both applications are incorporated by reference herein.

FIELD OF THE INVENTION

The invention relates to an electromechanical actuator, especially for an anti-roll bar of a motor vehicle, having two actuator elements which can be rotated relative to one another about a common rotation axis, an electric motor and a gear mechanism which is coupled to said electric motor being provided for this purpose, with the electric motor being arranged in an actuator element and an output shaft of the gear mechanism being coupled to the other actuator element in order to transmit a torque.

BACKGROUND OF THE INVENTION

In automobile engineering, hydraulic systems are often used to control components on the chassis in particular, but these are increasingly being replaced by electromechanical systems. Examples of this include, for example, electromechanical steering systems or, in particular, electrical anti-roll systems. Systems of this kind, for example an anti-roll bar, generally comprise an electromechanical actuator which has an electric motor and a gear mechanism which is connected downstream of said electric motor. Two actuator elements can be rotated relative to one another by means of the electric motor/gear mechanism combination. In the case of an anti-roll bar, the two actuator elements are each coupled to a torsion bar spring, these torsion bar springs in turn being mounted on the chassis and being connected to in each case one wheel by means of a suspension rod. As a function of the rotation of the actuator, torques can be built up and transmitted to the torsion bar springs, which are twisted in this case, these torques in turn serving to compensate for the rolling movement. The basic design, for example, of an anti-roll bar of this kind has long been known to a person skilled in the art and does not need to be described in any further detail.

During operation of the motor vehicle, load peaks may occur, for example when driving over a bump, these load peaks acting on the electromechanical system, that is to say the actuator, for example, of the anti-roll bar in this case. To date, the actuator has been correspondingly designed so that these load peaks can be absorbed by the actuator, that is to say that load peaks which have already been produced and can contribute more than twice the value of their nominal load depending on the application are taken into account when designing the actuator. For this purpose, these systems, that is to say the actuator, are accordingly formed to be mechanically considerably larger than would be necessary in terms of the actual nominal load, this leading to higher costs and disadvantages in terms of weight.

SUMMARY OF THE INVENTION

The invention is therefore based on the problem of specifying an electromechanical actuator which, particularly when used in automobile engineering, for example in an anti-roll bar, can be formed or designed to be sufficiently small in spite of the high load peaks which are produced by use.

In order to solve this problem, the invention makes provision, in an electromechanical actuator of the type cited in the introduction, for a mechanical overload clutch to be provided in the torque-transmitting load path from the electric motor to the gear mechanism output shaft.

The invention proposes reducing overloads, which occur, in the system, that is to say in the actuator, to a defined overload value by suitable measures. For this purpose, an overload prevention means in the form of an overload clutch is integrated according to the invention, said overload clutch reducing the loads occurring on the actuator to a defined overload which is significantly below the overloads without integration of such an overload prevention means. Therefore, the dimensions with respect to maximum load and individual events can be considerably reduced since the elements which can be greatly influenced by an overload, specifically the electric motor and its rotor, are decoupled by means of the overload clutch. With respect to the dynamics when the overload occurs, the overload clutch is to be integrated such that the element or elements with a high mass inertia are uncoupled since, in the case of dynamic misuse faults, for example driving over a bump, which lead to a very brief high overload occurring, specifically those mass inertia phenomena present in the system are critical for the overloads which occur. Electromechanical systems specifically generally have a step-up mechanical gear mechanism on account of the limited torque capacities of the electric motors used, usually permanent-magnet, brushless DC motors. This leads to the rotor of the electric motor generally representing the essential mechanical inertia. In the event of shock loads which are caused, as described, in the electrical anti-roll bars, for example by driving over a bump on one side, this high mass inertia prevents rapid reduction in torque and is therefore a cause of the mechanical overloads which act on the actuator. If, in contrast, as provided according to the invention, a reversible overload clutch is integrated, preferably between the rotor of the electric motor and the gear mechanism which is connected downstream, the result is that, given a defined overload torque which is defined by means of the design of the overload clutch, the electric motor or its rotor is decoupled from the gear mechanism, that is to say no that the corresponding mass inertia is also decoupled from the system and therefore the overload on the actuator can be significantly reduced. In this case, it is not important whether the decoupling takes place directly at the rotor of the electric motor or at another transmission member of the transmission gear mechanism, the only important factor is that the actual mass inertia is decoupled. Therefore, the overload clutch which is provided according to the invention can be present in different regions in the torque-transmitting load path from the electric motor to the gear mechanism output shaft.

Integration of the overload prevention means can also solve a further problem which results from the damping characteristic of the electric motor. In the case of an electric anti-roll bar for example, an attempt is made to achieve a reliable state of the system when the electrics fail by the electric motor being shorted and therefore a state which is expedient and reliable for driving safety is achieved by the resulting damping. However, as has been found, the damping characteristic of the electric motor has a special feature which is critical to safety. The damping torque in the permanent-magnet brushless DC motor used exhibits a rotation-speed-dependent maximum torque. If this torque is exceeded, the damping torque decreases as the rotation speed increases and the damping torque which is required for reliable operation can no longer be provided, the damped motor rotates excessively. This excessive rotation can be prevented by limiting the torque acting on the motor as a result of the mechanical overload clutch being integrated according to the invention since a further increase in rotation speed is prevented by the input torque or the decoupling torque being reached.

Overall, integrating the mechanical overload clutch according to the invention allows the actuator to be smaller since the maximum overloads to be absorbed by the clutch can be reduced to an amount which is significantly lower than the real overload. That is to say, the motor has to absorb only significantly lower load peaks, this in turn making it possible for the actuator to be designed to be smaller overall in terms of installation space and to be lighter and also more cost-effective.

As already described, it is necessary or expedient according to the invention, in the case of the electromechanical actuator, to decouple the elements which actually represent or define the mass inertia from the system. As described, the rotor of the electric motor represents the main mechanical inertia. Since there is a mechanical interface between the rotor and the gear mechanism input anyway, the overload clutch is, according to the invention, expediently integrated between the electric motor rotor and the input of the gear mechanism which is connected downstream, that is to say the rotor is directly decoupled. However, integration in another transmission member of the transmission gear mechanism would also be feasible.

According to a first alternative of the invention, the overload clutch can be an axially or radially acting spring-loaded latching clutch. This latching clutch, which is acted on by a torque, opens when the defined overload torque is reached, that is to say the clutch elements which are latched to one another disengage from one another, and the latching positions are skipped. In this case, the overload clutch can act axially or radially, depending on the design of the actuator.

Said overload clutch expediently has a first latch element which is coupled to a first element, in particular to the rotor, in a rotationally fixed manner and has latching receptacles, and also a second latch element which is coupled to a second element, in particular a sun gear of the gear mechanism, which can be decoupled from the first element, in a rotationally fixed manner, one of said latch elements being spring-loaded, with either the second latch element likewise having latching receptacles and, in particular, spherical latching elements being provided between the two latch elements, or with one or more latching projections which form a type of spur or radial tooth system being provided on the second latch element. The two latch elements are therefore connected to two elements which can be decoupled from one another by means of the clutch. This can be the rotor, while the other element is the sun gear or gear mechanism input gear of the gear mechanism when the latching clutch is positioned directly between the rotor and the gear mechanism. The latch design can be different. The two latch elements, of which one is spring-loaded, alternatively have corresponding latching clearances into which common latching elements, primarily latching balls, which are located between the two latch elements engage. If the clutch is opened, the latching elements slip out of the latching receptacles of one of the latch elements, this latch element continuing to rotate relative to the other, until the latching elements engage in other latch receptacles after the existing torque decreases, by means of which the clutch is closed again. Instead of such separate latching elements, it would also be feasible to provide one latch element with a tooth system which interacts with the latching receptacles of the other latch element.

It is expedient, particularly in the case of an axially acting latching clutch, when one of the latch elements is in the form of a disk and the other latch element is in the form of a sleeve, with a spring element, preferably a helical spring, being arranged in the sleeve. The sleeve is moved against the restoring force of the spring when the clutch is opened and the latching system is disengaged, the spring pushes the sleeve back into the latching position, by means of which the clutch is then closed again.

In the case of an axially acting latching clutch, it is necessary to axially integrate the sleeve and the disk, for example between the gear mechanism and the electric motor. In order to make this possible, the latching clutch expediently has a shaft which is connected to the gear mechanism input, in particular to a sun gear of the gear mechanism, in a rotationally fixed manner and which extends into the hollow-cylindrical rotor and is connected to one latch element, while the other latch element is connected to the rotor. The latch element which is located on the shaft is expediently the sleeve which, since it is spring-loaded, is mounted in an axially displaceable manner on the shaft. On account of the integration of the shaft in the interior of the rotor, there is sufficient installation space for the integration of the sleeve. The other latch element, that is to say the disk, is provided on the rotor, with the selected construction allowing simple design and simple integration in the interior of the rotor.

Since, as described, the shaft is guided into the rotor arriving from the gear mechanism, and in the process passes through the latching element on the rotor, that is to say the disk, it is expedient for this latch element to be mounted by a sliding bearing or a rolling bearing on the shaft which passes through it, so that good mechanical support is provided there.

As an alternative to the design as a latching clutch, the overload clutch can also be formed as an axially or radially acting friction clutch. In a friction clutch of this kind, the elements to be decoupled are connected by means of friction element which is connected to the two coupling partners by friction. As long as the applied torque is lower than the breakaway torque of the friction element, the two elements are connected to one another in a rotationally fixed manner. However, if the torque is equal to or greater than the breakaway torque, the friction element slips on one or other friction partner, that is to say the two rotate relative to one another, and the clutch opens. The overload can likewise be defined in a simple manner by means of the selection of the friction element or the design of the friction partner, and therefore a requirement-dependent exact design can be achieved.

The friction clutch expediently comprises an axially or radially prestressed friction ring which is clamped in between two elements which can be decoupled from one another. If the friction clutch is integrated between the rotor and the gear mechanism, the radially prestressed friction ring is arranged between the gear mechanism input shaft, that is to say ultimately the gear mechanism sun gear, and a ring, which slips over said gear mechanism input shaft and is provided on the rotor, in an accommodation space which is provided on the shaft-side and/or ring-side. The ring itself is expediently axially secured by means of a securing ring which is provided on the shaft-side. In addition to it functioning as part of the friction clutch, the ring can also serve to radially rotatably mount the rotor since it is possible to radially rotatably mount the rotor by means of the ring, that is to say that a corresponding rolling bearing is mounted on the ring.

In addition to the electromechanical actuator itself, the invention also relates to an anti-roll bar for a motor vehicle comprising two torsion bar springs which are connected by means of an actuator of the described type.

BRIEF DESCRIPTION OF THE DRAWINGS

An exemplary embodiment of the invention is illustrated in the drawing and is described in greater detail below. In the drawing.

DETAILED DESCRIPTION OF THE DRAWINGS

Figure 1:
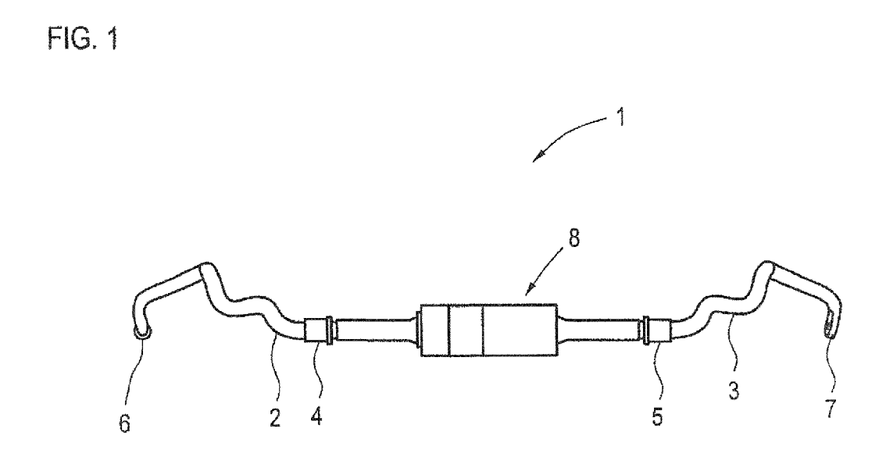
FIG. 1 shows a basic illustration of an anti-roll bar according to the invention with an actuator according to the invention.

FIG. 1 shows an anti-roll bar 1 comprising two torsion bar springs 2, 3 which are rotatably mounted on the vehicle-side by means of corresponding bearing points 4, 5 and are connected by way of their ends 6, 7 to the wheel of the motor vehicle, be it a front wheel or a rear wheel, by means of a suspension rod. The two torsion bar springs are connected to one another in a rotatable manner by means of an actuator 8 according to the invention.

Figure 2:
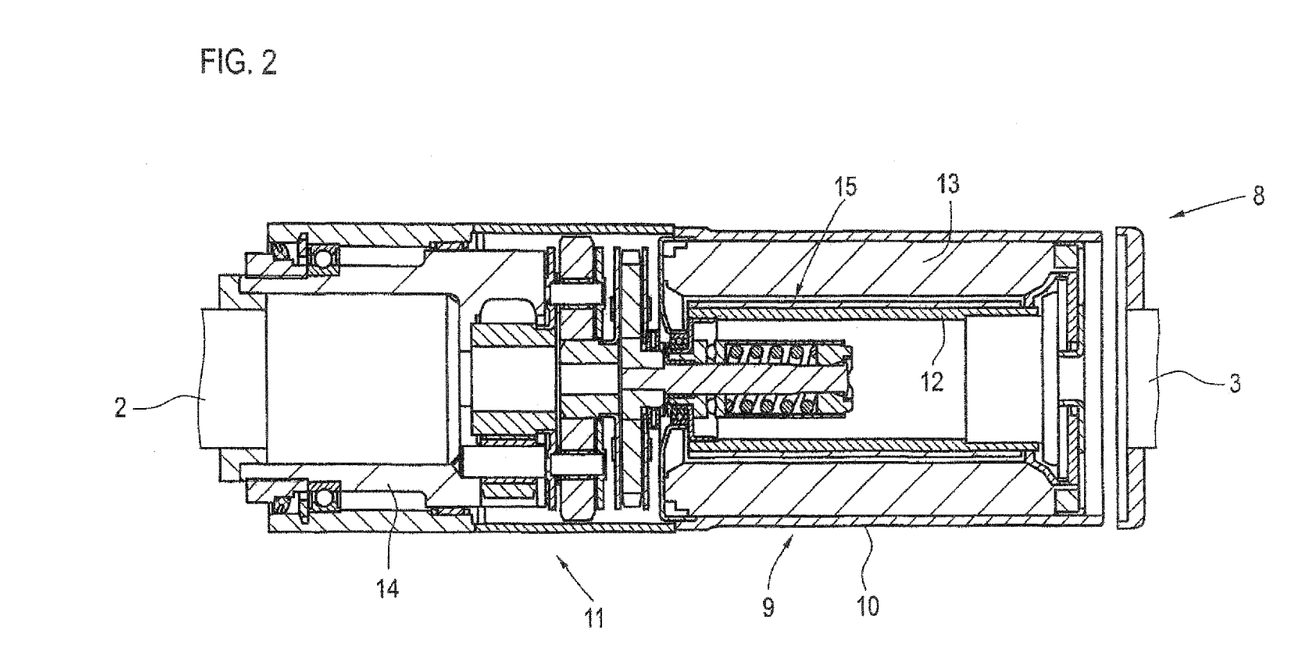
FIG. 2 shows a sectional view through the actuator from FIG. 1.

FIG. 2 shows a sectional view through the actuator 8 from FIG. 1. Said figure shows an electric motor 9 which is accommodated in a first actuator part 10 in the manner of a housing. A gear mechanism 11 is connected downstream of the electric motor, said gear mechanism being coupled to the rotor 12 which is accommodated in the stator 13 in a rotatable manner. The gear mechanism 11 has a rotatably mounted gear mechanism output drive shaft 14 which is connected to the torsion bar spring 2. At the other end, the torsion bar spring 3 is connected to the first actuator element 10. It is clear that it is possible to rotate the two torsion bar springs 2, 3 relative to one another by means of this design.

Figure 3:
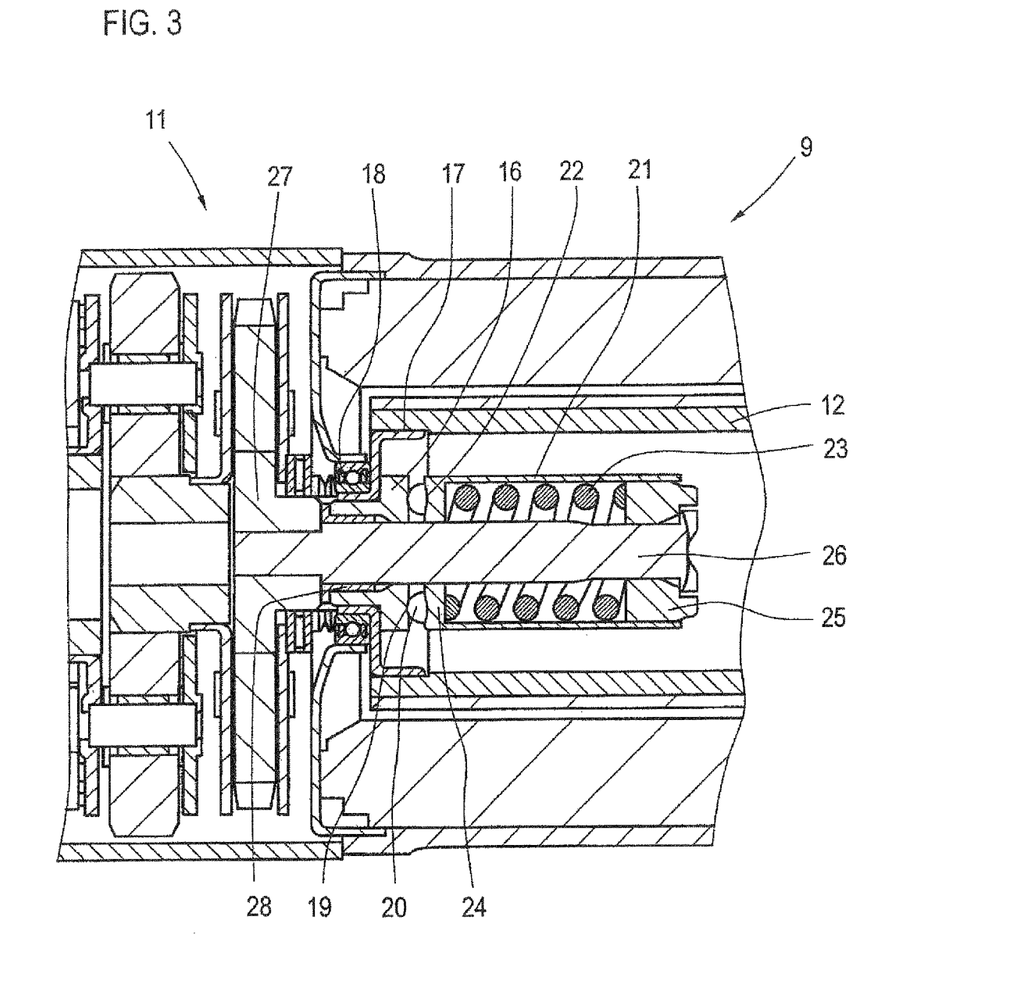
FIG. 3 shows an enlarged partial view of the actuator from FIG. 2 in the region of the latching clutch.

According to the invention, an overload clutch 15 is connected between the electric motor 9 and the transmission gear mechanism 11, said overload clutch being shown in greater detail in FIG. 3. In this case, the overload clutch 15 is designed as a latching clutch. It comprises a first latch element 16 which is in the form of a disk and is connected to the rotor 12 in a rotationally fixed manner. The latch element 16 is accommodated in a sleeve 17, which is connected to the rotor 12, said sleeve 17 forming the rotary mount of the rotor 12 by means of a rolling bearing 18. Latching receptacles 19 into which latching elements 20, in this case balls, engage, are provided on that side of the first latch element 16 or the disk 16 which faces the interior of the rotor.

A second latch element 21 in the form of a sleeve is associated with the first latch element, latching receptacles 22 which engage on the other side of the spherical latching elements 20 likewise being provided at the end faces of said second latch element. That is to say, said spherical latching elements are accommodated in mutually opposite latching receptacles 19, 22. The second latch element or the sleeve 21 is spring-loaded by means of a helical spring 23. Said helical spring is mounted on the inside of the sleeve base 24 at one end, and the other end bears against a driver 25. The sleeve 21 is mounted in an axially displaceable manner on this driver 25, so that it can be compressed against the restoring force of the helical spring 23.

The driver 25, for its part, is located on a shaft 26 which is connected to the sun gear 27 or another input shaft of the gear mechanism 11 in a rotationally fixed manner. It is clear that the shaft 26 extends into the interior of the rotor arriving from the gear mechanism 11, there being a sufficient amount of installation space in said interior of the rotor to integrate the disk 16 and the sleeve 21.

In this case, the spring force of the helical spring 23 is such that the balls 20 ensure the rotary connection between the latch disk 16 and the latch sleeve 21 up to a defined torque. This is achieved by the spring force which acts on the balls and the latching receptacles 19, 22 which are provided in the sleeve 21 and the disk 16. When this torque is exceeded, the sleeve 21 is pushed to the right against the active restoring force of the helical spring 23, the balls correspondingly slip over, so that the rotary connection is temporarily broken when the overload torque is exceeded. The latch disk 16 and the sleeve 21 rotate relative to one another in a decoupled manner in this case, they are no longer firmly rotationally connected, and therefore any overload torque which acts on the electric motor 9 from the gear mechanism 11 is decoupled and not passed through to the rotor 12. As soon as the applied overload torque is lower than the equivalent of the latching system and the spring force applied to it, the transfer of torque between the rotor 12 and the input of the gear mechanism 11 is again ensured. The relative movement and the associated friction during the latching-through process is reduced by means of a sliding bearing 28 by means of which the disk 16 is mounted in a sliding manner on the shaft 26. Instead of the sliding bearing, a rolling bearing can also be provided there. As an alternative, a friction lining can also be used in order to deliberately increase the friction.

Although the sleeve 21 is spring-loaded in this case, it would also be feasible, in principle, to connect the disk 16 in an axially displaceable and spring-mounted manner to the rotor 12 in a reverse manner of operation. The sleeve 21 would then be a rigid, non-spring-loaded element which rotates with the gear mechanism, while the disk 16 rotates with the rotor, as is also the case in the refinement according to FIG. 3.

While FIG. 3 shows an axially acting latching clutch, it goes without saying that it is also feasible to design the latching clutch in a radial manner too. The latching clutch could be integrated in the interior of the rotor 12 in this case also.

Figure 4:
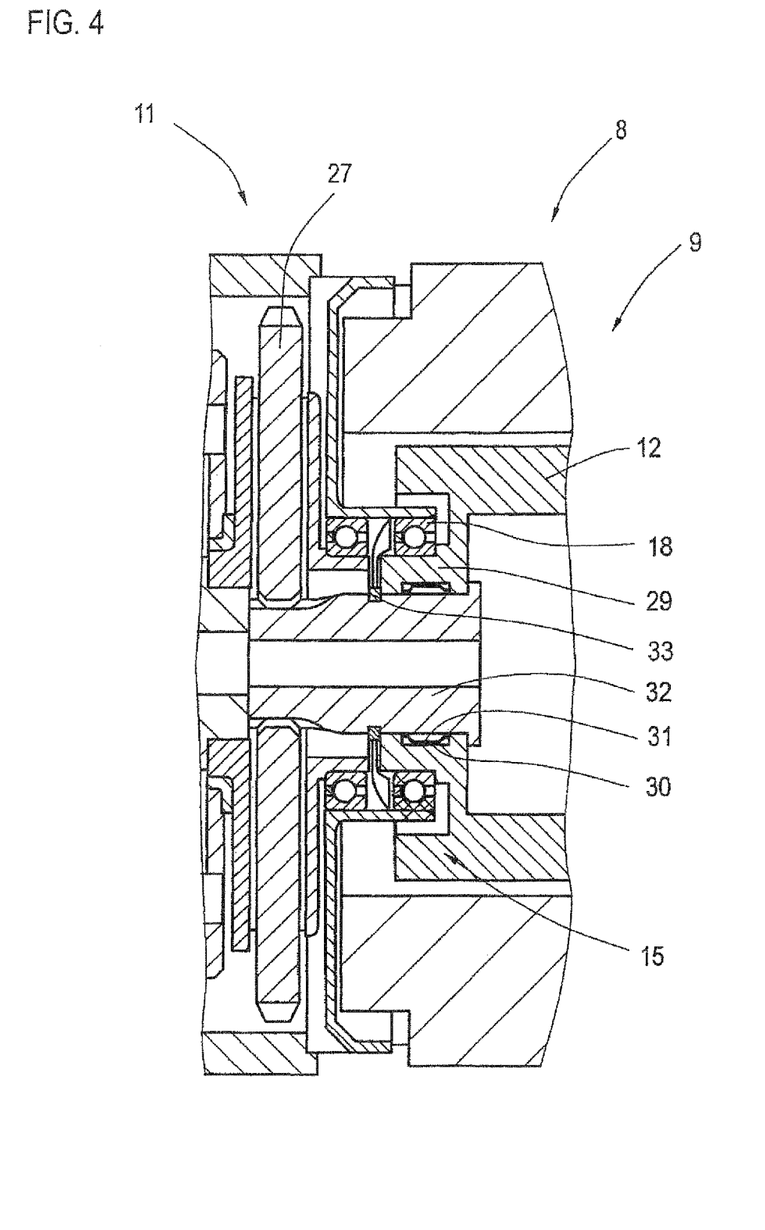
FIG. 4 shows a view of a detail of a second embodiment of the actuator with a friction clutch.

Finally, FIG. 4 shows a further embodiment of an actuator 8, with only a partial detail being shown in this case too. The same reference symbols are used as far as possible.

An electric motor 9 and a gear mechanism 11 are again provided, it again being possible to decouple said electric motor and gear mechanism from one another by means of an overload clutch 15 in this case. However, the overload clutch 15 is designed as a friction clutch in this case. The friction clutch acts radially in this case and again decouples the rotor 12 of the electric motor 9 from the gear mechanism input, in this case the sun gear 27 again. In this case, the sun gear 27 has an elongated journal 32 over which a bearing seat on the rotor 29, which is provided on the rotor, engages. The bearing seat 29 is connected to the rotor 12 in a rotationally fixed manner and is mounted on the other side by means of the rolling bearing 18 which forms the rotary mount of the rotor. The bearing seat 29 has a groove-like recess 30 in which a friction element 31 in the form of a prestressed friction ring is accommodated. This friction ring bears against the inside of the groove-like recess 30 and against the outside of the journal 32 of the sun gear 27 by friction. The bearing seat 29 is axially secured by means of a securing ring 33 which is provided on the journal 32 and, on the other side, the bearing seat is braced against the rotor 12.

The prestress of the friction ring 31 is now set such that a defined torque can be transmitted between the sun gear 27 and the rotor 12 by friction by means of the rotary connection. As soon as the applied torque is greater than the breakaway torque, the connection slips with a constant frictional torque. If the applied torque is smaller than the frictional torque, the transfer of torque between the rotor 12 and the gear mechanism input, that is to say the sun gear 27, is again ensured.

LIST OF REFERENCE NUMERALS

1 Anti-roll bar
2 Torsion bar spring
3 Torsion bar spring
4 Bearing point
5 Bearing point
6 End
7 End
8 Actuator
9 Electric motor
10 Actuator element
11 Gear mechanism
12 Rotor
13 Stator
14 Gear mechanism output drive shaft
15 Overload clutch
16 Latch element (disk)
17 Sleeve
18 Rolling bearing
19 Latching receptacle
20 Latching element
21 Latch element (sleeve)
22 Latching receptacle
23 Helical spring
24 Sleeve base
25 Driver
26 Shaft
27 Sun gear
28 Sliding bearing
29 Bearing seat on the rotor
30 Recess
31 Friction element
32 Journal

The invention claimed is:

1. An electromechanical actuator for an anti-roll bar of a motor vehicle, comprising:
two actuator elements which can be rotated relative to one another about a common rotation axis;
an electric motor; and
a gear mechanism which is coupled to said electric motor, with the electric motor being arranged in an actuator element and an output shaft of the gear mechanism being coupled to the other actuator element in order to transmit a torque from the electric motor,
wherein a mechanical overload clutch is provided in a torque-transmitting load path from the electric motor to the gear mechanism output shaft.

2. The electromechanical actuator as claimed in claim 1, wherein the overload clutch is provided between a rotor of the electric motor and an input of a downstream gear mechanism.

3. The electromechanical actuator as claimed in claim 1, wherein the overload clutch is an axially or radially acting spring-loaded latching clutch.

4. The electromechanical actuator as claimed in claim 3, wherein the latching clutch comprises a first latch element which is coupled to a first element in a rotationally fixed manner and has latching receptacles, and a second latch element which is coupled to a second element and which can be decoupled from the first element, in a rotationally fixed manner, one of said latch elements being spring-loaded, with either the second latch element likewise having latching receptacles and spherical latching elements being provided between the two latch elements, or with one or more latching projections being provided on the second latch element.

5. The electromechanical actuator as claimed in claim 4, wherein one of the latch elements is a disk and the other latch element is a sleeve, with a spring element being arranged in the sleeve.

6. The electromechanical actuator as claimed in claim 4, wherein the latching clutch comprises a shaft which is connected to a gear mechanism input in a rotationally fixed manner and which extends into the rotor and is connected to one latch element, while the other latch element is connected to the rotor.

7. The electromechanical actuator as claimed in claim 6, wherein the spring-loaded latch element, which is connected to the shaft in a rotationally fixed manner is mounted on the shaft in an axially displaceable manner.

8. The electromechanical actuator as claimed in claim 7, wherein the spring-loaded latch element is a spring-loaded sleeve.

9. The electromechanical actuator as claimed in claim 4, wherein the first element is a rotor and the second element is a sun gear of the gear mechanism.

10. The electromechanical actuator as claimed in claim 6, wherein the other latch element which is connected to the rotor is mounted by a sliding bearing or a rolling bearing on the shaft which passes through it.

11. The electromechanical actuator as claimed in claim 6, wherein the shaft is connected to a sun gear of the gear mechanism.

12. The electromechanical actuator as claimed in claim 1, wherein the overload clutch is an axially or radially acting friction clutch.

13. The electromechanical actuator as claimed in claim 9, wherein the friction clutch comprises an axially or radially prestressed friction ring which is damped in between two elements which can be decoupled from one another.

14. The electromechanical actuator as claimed in claim 13, wherein the radially prestressed friction ring is arranged between the gear mechanism input shaft and a ring, which slips over a gear mechanism input shaft and is provided on the rotor, in an accommodation space which is provided on the shaft-side and/or ring-side.

15. The electromechanical actuator as claimed in claim 14, wherein the ring is axially secured by means of a securing ring which is provided on the shaft-side.

16. The electromechanical actuator as claimed in claim 14, wherein the rotor is radially rotatably mounted by means of the ring.

17. An anti-roll bar for a motor vehicle, comprising two torsion bar springs which are connected by means of an actuator as claimed in claim 1.

* * * * *

UNITED STATES PATENT AND TRADEMARK OFFICE
CERTIFICATE OF CORRECTION

PATENT NO. : 8,613,452 B2  Page 1 of 1
APPLICATION NO. : 13/054225
DATED : December 24, 2013
INVENTOR(S) : Grau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 194 days.

Signed and Sealed this
Twenty-second Day of September, 2015

Michelle K. Lee
*Director of the United States Patent and Trademark Office*